United States Patent [19]
Yamamoto et al.

[11] Patent Number: 5,605,585
[45] Date of Patent: Feb. 25, 1997

[54] METHOD FOR PRODUCING HYDROGEN STORAGE ALLOY PARTICLES AND SEALED-TYPE NICKEL-METAL HYDRIDE STORAGE BATTERY USING THE SAME

[75] Inventors: Osamu Yamamoto, Hirakata; Katsunori Komori, Kadoma; Kohei Suzuki, Yao; Seiji Yamaguchi, Osaka; Tadao Kimura, Kobe; Munehisa Ikoma, Shiki-gun; Yoshinori Toyoguchi, Yao, all of Japan

[73] Assignee: Matsushita Electric Industrial Co., Ltd., Osaka, Japan

[21] Appl. No.: 271,826

[22] Filed: Jul. 7, 1994

[30] Foreign Application Priority Data

Jul. 15, 1993 [JP] Japan ............................. 5-198860
Aug. 3, 1993 [JP] Japan ............................. 5-212310
Oct. 25, 1993 [JP] Japan ............................. 5-265329

[51] Int. Cl.$^6$ ............................. B22F 9/08; H01M 4/04
[52] U.S. Cl. ............................. 148/513; 75/338; 75/352; 75/359; 420/400
[58] Field of Search ............................. 75/337, 338, 352, 75/355, 359, 360; 148/513; 420/900

[56] References Cited

U.S. PATENT DOCUMENTS

| 4,437,883 | 3/1984 | Kubo et al. ............................. 75/337 |
| 5,043,233 | 8/1991 | Kameoka et al. ............................. 429/59 |
| 5,219,678 | 6/1993 | Hasebe et al. ............................. 429/59 |
| 5,338,333 | 8/1994 | Uda et al. ............................. 420/900 |
| 5,462,577 | 10/1995 | Ogura et al. ............................. 75/255 |
| 5,518,509 | 5/1996 | Tadokoro et al. ............................. 420/900 |

FOREIGN PATENT DOCUMENTS

| 1001453 | 12/1976 | Canada ............................. 420/900 |
| 4-106872 | 4/1992 | Japan . |
| 4-126361 | 4/1992 | Japan . |
| 4-329262 | 11/1992 | Japan . |
| 5-331506 | 12/1993 | Japan . |

OTHER PUBLICATIONS

*Metals Handbook,* Ninth Edition, vol. 5, pp. 264, 284, 285, ASM 1982.

*Primary Examiner*—George Wyszomierski
*Attorney, Agent, or Firm*—Panitch Schwarze Jacobs & Nadel, P.C.

[57] ABSTRACT

A method for manufacturing hydrogen storage alloy particles comprises steps of obtaining a melt of the hydrogen storage alloy and pulverizing the hydrogen storage alloy by water atomizing process, whereby the melt is pulverized by contacting or colliding with high-speed jetting thereto to be dispersed in the form of solidified fine particles. By employing an aqueous solution of hypophosphorous acid or an alkali aqueous solution in place of water during the water atomizing process, or by etching the oxide films once formed on the surface of the hydrogen storage alloy particles with an aqueous solution of a strong acid, the thickness of the oxide film can be made thinner, and thus a high discharge capacity of a battery configured with a negative electrode comprising the alloy particles can be realized.

32 Claims, 5 Drawing Sheets

METHOD FOR PRODUCING HYDROGEN STORAGE ALLOY PARTICLES AND SEALED-TYPE NICKEL-METAL HYDRIDE STORAGE BATTERY USING THE SAME

BACKGROUND OF THE INVENTION

1. Filed of the Invention

The present invention relates to a method for producing hydrogen storage alloy particles which can absorb and desorb hydrogen in a reversible manner and to a sealed-type nickel-metal hydride storage battery using the same alloy particles.

2. Description of the Related Art

Recently, nickel-metal hydride storage batteries utilizing a negative electrode comprising a metal hydride, i.e., a hydrogen storage alloy, capable of absorbing and desorbing hydrogen in a reversible manner at a low pressure have been developed and have been attracting attention as clean rechargeable batteries having a long cycle life and a high energy density and being substantially free from environmental concern.

The long cycle life and the high energy density of the batteries are based on the least probability of forming and subsequent deformation of dendrites theoretically, which might be a cause for short-circuiting. The least environmental concern is based on the constituent of the batteries containing no harmful substance such as cadmium (Cd).

The hydrogen storage alloy can be classified into two general groups, an $AB_5$ type consisting mainly of rare earth elements and nickel (Ni), and an $AB_2$ type consisting mainly of zirconium (Zr) and manganese (Mn).

Heretofore, an alloy of the above-mentioned $AB_5$ type has been employed as the material for negative electrode Of the rechargeable batteries. The battery characteristics such as discharge capacity, inner pressure, preserving property and cycle life are well-balanced in the $AB_5$ type alloy.

Typical manufacturing process of the negative electrode comprising the $AB_5$ type alloy can be exemplified as follows. First, each of the predetermined amounts of the constituent metals of the hydrogen storage alloy is placed in a melting furnace such as high frequency melting furnace and molten completely therein. The melt is then poured into a water-cooled casting die to produce an ingot of the hydrogen storage alloy. After the ingot is subjected to an annealing treatment under vacuum or an argon atmosphere, it is mechanically pulverized by a jaw crusher or a jet mill into a powder having an average particle diameter of about 20–30 μm (casting and pulverizing process).

Next, in order to enhance the electrode activity of the surface of the powder, the powder is subjected to a so-called alkali treatment whereby it is soaked in an aqueous solution of potassium hydroxide at a high temperature of 60°–90° C. for about 20 minutes to about 4 hours, and washed with water to obtain the hydrogen storage alloy powder for the negative electrode.

A paste for the negative electrode is prepared by mixing the powder thus obtained with a viscosity-enhancing agent such as carboxymethyl cellulose or polyvinyl alcohol, a rubber binder and water, as well as an electrically conductive agent such as carbon if required. A conductive core acting as a current collector of the negative electrode such as a punched or perforated metal sheet is coated with this paste, and the coated sheet is dried and pressed. In this manner, the negative electrode wherein bonding forces among the constituents of the electrode are further strengthened is produced.

In the above-mentioned manufacturing process of the negative electrode, fine powders having a smaller particle size than 10 μm are however inevitably produced in a considerable amount during the pulverizing step of the alloy. The fine powders can hardly participate in a function of the negative electrode. The surfaces of the fine powders are very active and are covered with firm oxide films, and thus can not absorb or desorb the hydrogen. For this reason, the fine powders bring a decrease in the energy density and another decrease in the high-rate discharge characteristics of the battery configured with the hydrogen storage alloy powder containing such fine powders.

Further, the removal of the fine powders requires a large hike in the manufacturing cost. Since the alloy of the $AB_2$ type is harder than the $AB_5$ type alloy, it requires a longer time period in the pulverizing step than that of the $AB_5$ type alloy, leading to a higher manufacturing cost.

Undesirable subsequent pulverization of the hydrogen storage alloy powder during the charging and discharging process can be pointed out as a cause for deteriorating the cycle life in the test. The hydrogen storage alloy powders obtained by the mechanical pulverization each have a polygonal shape with planes of cleavage containing acute angles, and thus have a disadvantage that they are liable to be further pulverized from the sites with acute angles by a volumetric expansion and contraction during the charging and discharging process.

In order to overcome this disadvantage, a pulverization by means of inert gas atomizing or centrifugal spraying has since been devised and proposed in, for instance, U.S. Pat. No. 5,219,678. The hydrogen storage alloy powders produced by the inert gas atomizing process or the centrifugal spraying process are themselves having substantially a spherical shape or a shape approximating to a sphere because the process contains no mechanical pulverizing step.

However, the inert gas atomizing process or the centrifugal spraying process is only capable of producing particles with an average particle diameter of about 50–60 μm which is too large to obtain an optimum result, and thus requires a separate subsequent pulverizing step. Therefore, the process brings a decrease in the cycle life characteristics and a hike in the manufacturing cost. Further, the inert gas atomizing process requires inert gas such as expensive argon gas in large quantities, and thus any great reduction in the manufacturing cost cannot be expected.

SUMMARY OF THE INVENTION

It is therefore the primary object of the present invention to provide a method for producing the hydrogen storage alloy particles which give a negative electrode excellent in the cycle life characteristics in the low manufacturing cost.

It is another object of the present invention to provide a nickel-metal hydride storage battery configured with a negative electrode containing such hydrogen storage alloy particles.

The present invention provides a method for manufacturing fine particles of a hydrogen storage alloy by pulverizing the hydrogen storage alloy by means of water atomizing process, whereby the melt is pulverized by contacting or colliding with high-speed water jetting thereto to be dispersed in the form of solidified fine particles.

In a preferred embodiment of the present invention, the water employed in the water atomizing process is an aqueous solution of hypophosphorus acid.

In another preferred embodiment of the present invention, the method comprises steps of:

pulverizing the melt of the hydrogen storage alloy by water atomizing process, and removing at least part of oxide film formed on the surfaces of the obtained hydrogen storage alloy particles.

The above-mentioned step of removing at least part of oxide film formed on the surfaces of the obtained hydrogen storage alloy particles comprises steps of etching the oxide film formed on the surface by soaking the hydrogen storage alloy particles in a dilute solution of a strong acid selected from the group consisting of hydrochloric acid and nitric acid, and washing the surface with water.

In a further preferred embodiment of the present invention, the step of removing at least part of oxide film formed on the surfaces of the obtained hydrogen storage alloy particles is a step of reducing the oxide film formed on the surfaces of the hydrogen storage alloy particles with a reducing agent.

In still another embodiment of the present invention, the water employed in the water atomizing process is an alkali aqueous solution.

The present invention also provides a nickel-metal hydride storage battery comprising a negative electrode containing an electrode material of hydrogen storage alloy particles each having substantially a spherical shape or a shape approximating to a sphere with an average particle diameter in a range from 10 μm to 50 μm and being free from a plane of mechanical cleavage, a positive electrode composed of nickel hydroxide, and an alkaline electrolyte.

Further, the present invention provides a nickel-metal hydride storage battery comprising a negative electrode containing an electrode material of hydrogen storage alloy particles each having a spherical shape or a shape which approximates to a sphere of an average particle diameter in a range from 10 μm to 50 μm and a needle-like metal hydroxide layer on its surface, and being free from a plane of mechanical cleavage, a positive electrode composed of nickel hydroxide, and an alkaline electrolyte.

While novel features of the invention are set forth in the precedings, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Atomizing with Hypophosphorous Acid Solution

Figure 1:
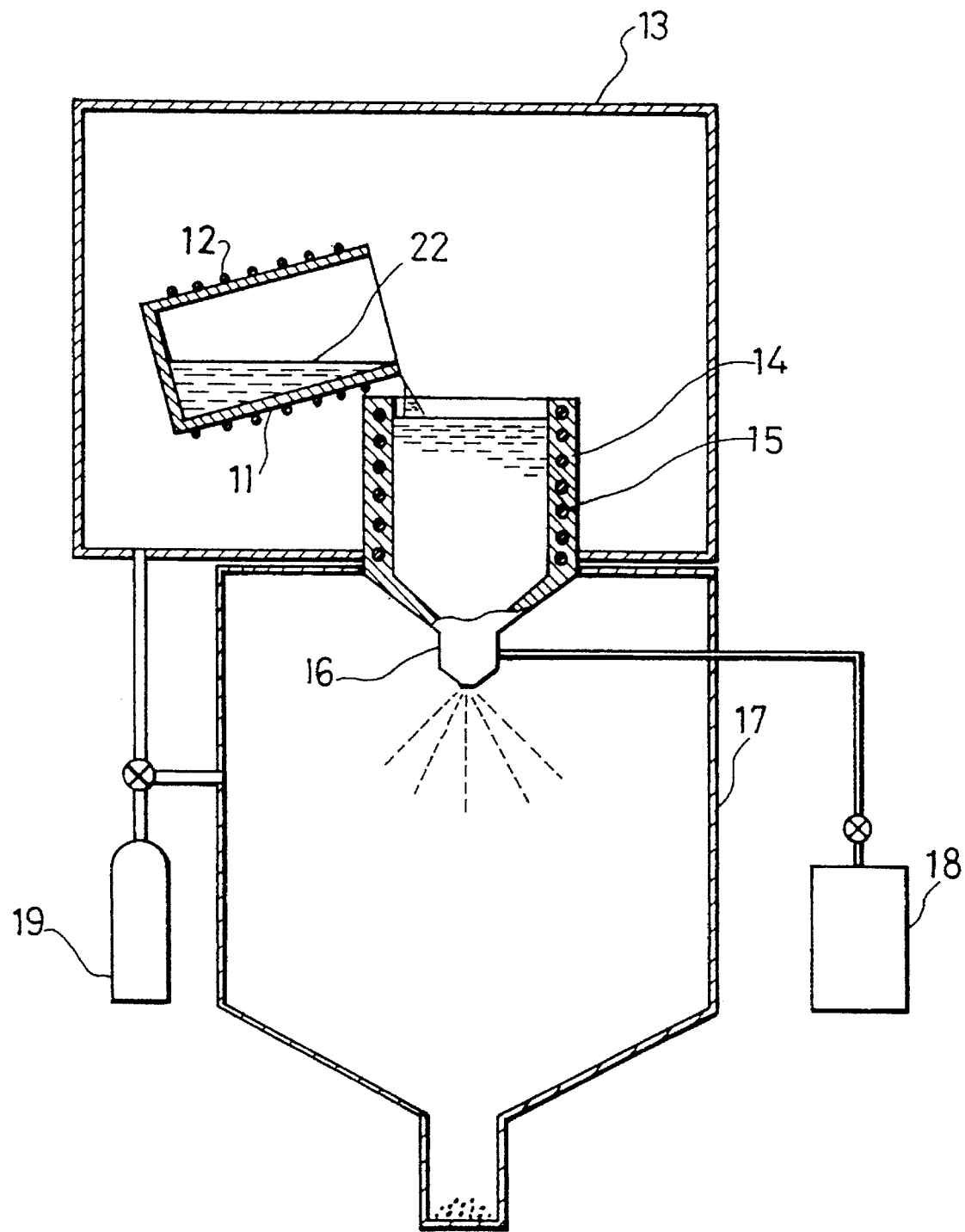
FIG. 1 is a view showing a schematic configuration of an apparatus employed in a water atomizing process of an embodiment of the present invention.

As described in the above, the present invention has a basic concept of producing the hydrogen storage alloy particles by means of water atomizing process. In this process, formation of the oxide film on the surfaces of the resultant alloy particles can effectively be suppressed by employing an aqueous solution of hypophosphrous acid as the liquid to cause a contact with the melt of the alloy. The concentration of the aqueous solution of hypophosphrous acid is suitably in a range from 0.2N to 5N.

Atomizing with Alkali Solution

Further, by employing an alkali aqueous solution, it is possible to form a metal hydroxide, in particular, a hydroxide of rare earth element, in a case of producing an alloy of the $AB_5$ type, on the surfaces of the alloy particles. By employing the alkali aqueous solution in the atomizing process, a separate and subsequent alkali treatment of the hydrogen storage alloy particles can be omitted from the prior art production process of an electrode. As the alkali aqueous solution, an aqueous solution of potassium hydroxide (KOH) and/or sodium hydroxide (NaOH) at pH10–pH13 is effective for this purpose.

Removal of Oxide Film with Strong Acid

The hydrogen storage alloy particles pulverized in the water atomizing process each have a thick oxide film on their surface. In a preferred embodiment of the present invention, at least part of the oxide film is removed by a step of etching the oxide film formed on the surfaces by soaking the hydrogen storage alloy particles in a dilute solution of a strong acid selected from the group consisting of hydrochloric acid and nitric acid followed by washing with water. Suitable concentration of the strong acid solution employed for removing the oxide film is in a range from 0.1N to 1N and the degree of the etching can be controlled by adjusting the etching time. It is preferable to make the thickness of the oxide film to 0.2 μm or thinner. An excessive degree of the etching however leads to a loss in material because a part of the hydrogen storage alloy itself is dissolved in the acid solution. Therefore, it is preferable to etch only the oxide films on the alloy surfaces by adequately adjusting the concentration of the acid solution, the etching time and the temperature of the etching solution.

Removal of Oxide Film by Reduction

A further preferred embodiment of the process for removing at least part of the oxide film formed on the surfaces of the hydrogen storage alloy particles produced by the water atomizing process comprises a step of heating a press-molded body composed of a mixture of a reducing agent of metal calcium (Ca) or Ca and calcium chloride ($CaCl_2$) with the hydrogen storage alloy particles in an inert gas atmosphere at a temperature ranging from 700° C. to 1100° C., followed by washing with water or an aqueous solution of ammonium chloride. In this reduction step, if the reduction is performed in a state wherein the hydrogen storage alloy particles are simply mixed with the reducing agent, the reducing reaction proceeds too rapidly while generating a high heat of reaction which melts the hydrogen storage alloy particles, and the particles once pulverized on purpose are sometimes agglomerated into large masses.

Pelletization of Alloy Particles

In order to obviate the above-mentioned inconvenience attributable to the heat generated by the reaction, it is preferable to press-mold the mixture of the hydrogen storage alloy particles with the reducing agent into pellets of block shape or thin tubular bodies and to reduce the molded-bodies by subjecting them to the heat-treatment, as will be described in the examples below. After the reduction, the reducing agent is removed by washing the reduced molded-bodies with water or an aqueous solution of ammonium chloride. During this removing step, the molded-bodies after the reduction-treatment are easily fallen into pieces of the particles.

As the reducing agent, Mg or Al may be employed in place of Ca. In this manner, the hydrogen storage alloy particles are obtained. Although the oxide films which had been formed on the surfaces of the hydrogen storage alloy particles are completely removed immediately after the reduction, fresh oxide films of about 0.05 μm thickness are formed again by the water washing treatment. In the above-mentioned manner, the hydrogen storage alloy particles capable of giving a high discharge capacity to a battery can be obtained by removing at least part of the oxide films formed on the surfaces of the alloy particles.

State of Oxide Film

The oxide film may be in a variety of states. In one of the states, it completely coats the surfaces of the hydrogen storage alloy particles. In another state, it is porous film having numerous pores, and in a further state, the oxide film partly coats the surfaces but with a large thickness. As a result of diversified investigation, the present inventors have now found that an oxide film of a thickness of 0.2 μm or thinner is porous and is capable of absorbing or desorbing hydrogen. It is desirable to make the thickness of the oxide film to be 0.1 μ or thinner.

The above-mentioned hydrogen storage alloy particles can be used in configuring an electrode as they are.

Further, in a preferred embodiment of the present invention, the above-mentioned hydrogen storage alloy particles may be subjected to an annealing treatment in a hydrogen gas atmosphere, or to an alkali treatment whereby the alloy particles are soaked in a strong alkali aqueous solution at a high temperature and then washed with water.

Annealing treatment

Conditions for the annealing treatment in a hydrogen gas atmosphere are preferably such that first evacuating an annealing chamber, introducing hydrogen gas into the chamber at 10–76 cmHg, maintaining a space inside the chamber at a temperature ranging from 800° C. to 1200° C. for 3 hours or longer, and then gradually cooling the chamber over the next 3 hours or longer. By annealing under these conditions, it is possible to realize an increase in the discharge capacity of the electrode comprising the hydrogen storage alloy particles.

Alkali treatment

Conditions for the alkali treatment are preferably such that soaking the hydrogen storage alloy particles in an aqueous solution of KOH and/or NaOH having a density in a range from 1.25 g/cm$^3$ to 1.35 g/cm$^3$ and a temperature in a range from 60° C. to 90° C. for a period ranging from 20 minutes to 4 hours, followed by washing with water.

The hydrogen storage alloy particles obtained in this manner are free from planes of mechanical cleavage and have a spherical shape or a shape approximating to a sphere of an average particle diameter in a range from 10 μm to 50 μm with oxide films of 0.2 μm or thinner, or similar metal hydroxide layers on their surfaces.

Advantage of Spherical Particles

The present invention has the following advantageous features which cannot be obtained with any of the prior art cast pulverization process and gas atomizing process, resulting from its step of pulverizing the hydrogen storage alloy by water atomizing process.

First, a velocity in rapid cooling (jetting velocity of water or aqueous solution) is several tens times larger than that in the gas atomization process and a pulverization to the fine particles up to about 10 μm can be performed in a single step. A subsequent mechanical pulverizing step required in the prior art process can therefore be dispensed with, and thus the manufacturing cost can be reduced a great deal. Further, since the process of the present invention does not use an inert gas such as expensive argon gas in large quantities, the manufacturing cost of the alloy can be reduced also in this respect.

Second, thanks to no provision of a subsequent mechanical pulverizing step, the resultant hydrogen storage alloy particles have a spherical shape or a shape approximating to a sphere, being free from planes of mechanical cleavage, and any subsequent undesirable pulverization of the hydrogen storage alloy particles during the charging and discharging process hardly takes place, thereby giving a long cycle life to an electrode configured with the alloy particles.

Third, by atomizing the hydrogen storage alloy by using an alkali aqueous solution, the metal hydroxide layers are formed on the surface of the alloy particles in a single step and thus the process can dispense with a separate alkali treatment as required in the prior art process.

Particle Diameter

The diameter of the particles obtained by atomizing process is proportional to the velocity in the rapid cooling in general. So the prior art gas atomizing process can only give spherical particles of an average particle diameter of 50 μm or more because a velocity in the rapid cooling (Jetting velocity) of about $10^{5°}$ C./second is a ceiling velocity for the prior art gas atomizing process. On the other hand, the water atomizing process has a high velocity in the rapid cooling of about $10^{6°}$–$10^{7°}$ C./second, and can yield finer particles having an average particle diameter of about 10 μm. Although alloy particles having an average particle diameter of about 20–30 μm are desirable as the negative electrode material for the nickel-metal hydride storage battery in general, the water atomizing process has an advantage of arbitrarily obtaining any class of the alloy particles having a particle diameter in the above-mentioned range with ease by an appropriate adjustment of the jetting velocity without requiring any subsequent mechanical pulverizing step. As a similar method for producing the alloy particles, there is an oil atomizing process. this case, removal of oil sticking to the resultant hydrogen storage alloy particles is difficult and expensive, and further the oil atomizing process has another disadvantage of contaminating the resultant alloy with carbon.

Originally, the hydrogen storage alloy particles pulverized by the water atomizing process each have a thick oxide film on their surface for themselves and a negative electrode configured with the particles has a low discharge capacity. The present inventors have now found that in a case of employing an aqueous solution of hypophosphorous acid which has a strong reducing ability in place of water in the water atomizing process, the oxide films can be made considerably thinner, the absorption and desorption of hydrogen can be made easy, and thus a higher discharge capacity can be realized by using a negative electrode configured with the alloy particles. In the case of employing the alkali aqueous solution in place of water, the surfaces of the hydrogen storage alloy particles are covered with needle-like metal hydroxides of rare earth elements. Each of the needle-like metal hydroxides acts as an activation point for absorbing hydrogen, improves the initial activation, and increases the discharge capacity.

Further, hydrogen storing ability of the oxide films formed on the surfaces of the hydrogen storage alloy particles produced by the water atomizing process can be restored a great deal by being etched with a strong acid or by being reduced with a reducing agent such as Ca.

Moreover, it is already known that by annealing the alloy particles, crystalline property or homogeneity in microcrystals of the particles can be improved, the hydrogen absorbing and desorbing ability can be increased and the discharge capacity of the negative electrode configured with the alloy particles can be improved in general. An annealing performed specifically in a hydrogen gas atmosphere has an advantage that oxidation of the surfaces of the alloy particles can be suppressed, and a higher discharge capacity of an electrode configured with the alloy particles can be realized without deteriorating the high-rate discharge characteristics.

As discussed in the above, in accordance with the present invention, fine particles of the hydrogen storage alloy having an average particle diameter of about 20 μm can be produced in a single step by pulverizing the alloy by the water atomizing process which has a high velocity in the rapid cooling. Any subsequent mechanical or other pulverizing step required in the prior art cast pulverization process or gas atomizing process can therefore be dispensed with.

Further, since the method of the present invention does not use the expensive inert gas such as argon gas in large quantities as compared with the prior art gas atomizing process, a great reduction of the manufacturing cost can be realized. Moreover, since the method of the present invention does not contain any subsequent mechanical pulverizing step, the resultant particles have a spherical shape or a shape approximating to a sphere having no acute edge, and undesirable pulverization during the charging and discharging cycles hardly takes place, thereby giving a long cycle life to a storage battery configured with these alloy particles. Moreover, a further long cycle life of the storage battery configured with the alloy particles can be realized by atomizing the alloy with the aqueous solution of hypophosphorous acid which has a strong reducing ability or the alkali aqueous solution during the water atomizing process, and by removing at least part of the once formed oxide film by an etching with a strong acid or by a reduction with Ca.

As described in the above, in accordance with the method for manufacturing the hydrogen storage alloy particles of the present invention, it is possible to provide a nickel-metal hydride storage battery having a long cycle life with a low manufacturing cost.

In the following paragraphs, concrete embodiments of the present invention will be described in detail together with comparative examples by referring to the attached drawings.

Figure 2:
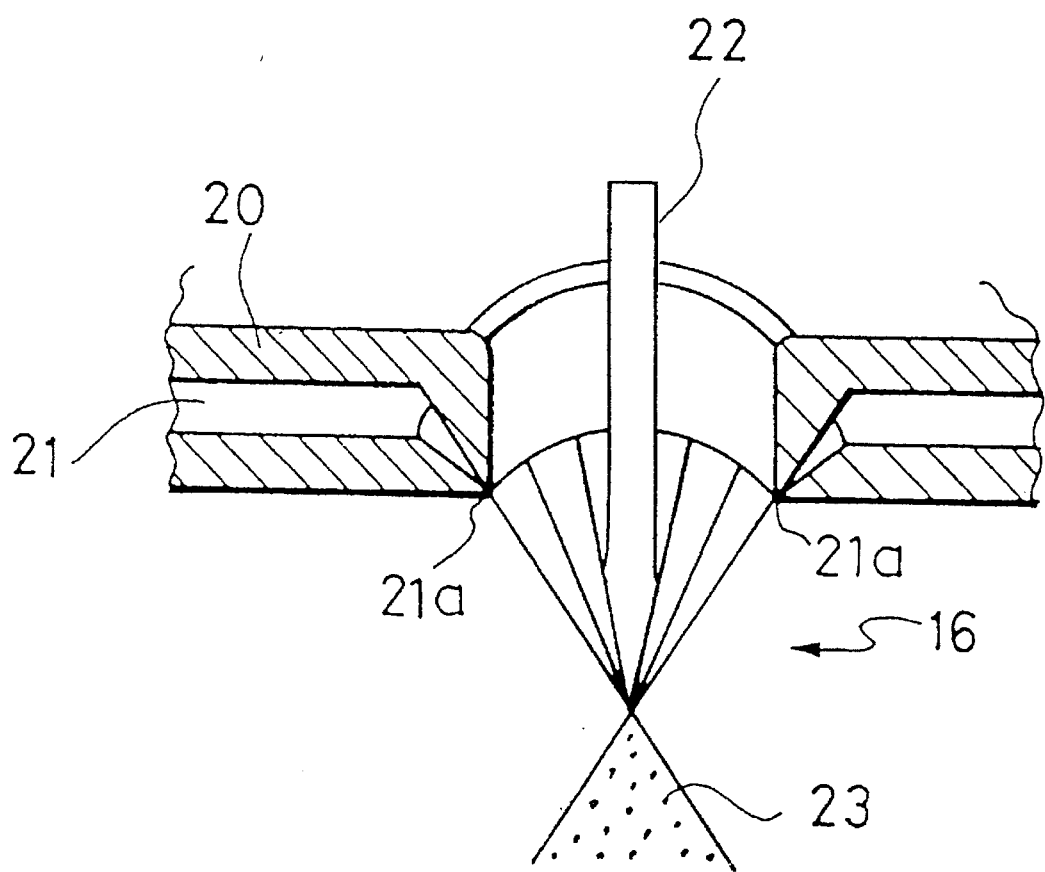
FIG. 2 is an enlarged cross-sectional perspective view showing a principal part of a melt-pouring nozzle in the apparatus.

FIG. 1 is a view showing a schematic configuration of an apparatus employed in a water atomizing process in the embodiments, and FIG. 2 is an enlarged cross-sectional perspective view showing a principal part of a melt-pouring nozzle in the apparatus.

As seen from these figures, a high frequency melting furnace 11 is equipped with a coil 12 through which a current is flown at a high frequency. A melt 22 of the hydrogen storage alloy is supplied to a retainer furnace 14 equipped with an electric heating coil 15. A melt-pouring nozzle 16 provided at the bottom of the retainer furnace 14 has a path for the melt which opens into a collector silo 17 for collecting the alloy particles. The body 20 of the melt-pouring nozzle 16 is provided with a water channel 21 having outlets 21a directed to the path for the melt 22. This structure enables the melt-pouring nozzle 16 to cause the water supplied by a high pressure pump 18 to Jet from the outlets 21a and to collide with the melt 22. A reference numeral 19 is a bomb of an inert gas to be supplied into the collector silo 17 for collecting the particles. The melt 22 of the hydrogen storage alloy poured along the center of the path is scattered by the water which jets from the outlets 21a of the water channel 21 and collides with the melt 22, and pulverized into fine particles 23. A closed chamber 13 accommodates the high frequency melting furnace 11 and the retainer furnace 14, and the air inside the closed chamber 13 is preferably substituted with the inert gas supplied by the bomb 19. In the following Examples, the closed chamber 13 is kept in an argon gas atmosphere.

EXAMPLE 1

(Water Atomizing Process)
Alloy Particles

Each of misch metal (Mm) containing lanthanum (La) at 20% by weight, nickel (Ni), manganese (Mn), aluminum (Al) and cobalt (Co) were mixed together at a predetermined proportion and placed in the high frequency melting furnace 11. After the furnace was filled with argon gas, the high frequency current was flown through the coil 12 to melt the metals and a hydrogen storage alloy 22 whose composition is represented by the formula: $MmNi_{3.7}Mn_{0.4}Al_{0.3}Co_{0.6}$ was first produced. The alloy in molten state was poured into the retainer furnace 14. Then, the melt 22 was poured into the collector silo 17 filled with argon gas through the melt-pouring nozzle 16. During this step, water is Jetted from the inner periphery of the melt-pouring nozzle 16 by the high pressure pump 18 at a pressure of 800 kg/cm$^2$ and collided with the melt 22, thereby atomizing the melt 22 of the hydrogen storage alloy into particles 23.

The hydrogen storage alloy particles thus obtained took various shapes, including those from a shape approximating to a sphere to a gourd-shape, constituted with curved surfaces with no acute edges, and their surfaces are covered with oxide films (thickness: 0.4 μm). As a result of measurement on their particle diameter distribution, it was found that the average particle diameter of the obtained alloy particles was 25 μm, distributed over a range from 9 μm to 50 μm and the alloy particles contained those of 10 μm or smaller at only 0.4% by weight or less.

Electrodes

Next, a paste for the negative electrode was prepared by mixing 100 parts by weight of the hydrogen storage alloy particles, 0.5 parts by weight of styrene-butadiene rubber particles (binder or binding medium), 0.2 parts by weight of carboxymethyl cellulose (viscosity enhancing agent), 0.2 parts by weight of carbon black (conductive agent), and 16 parts by weight of water (dispersing medium). A conductive core made of punched or perforated metal sheet was coated with this paste, then dried and pressed by a roller press. A nickel lead wire was fixed to the coated sheet to obtain a negative electrode. A positive electrode was prepared by loading 2.2 g of a positive electrode mixture composed mainly of nickel hydroxide on a core material of foamed nickel.

Battery for Evaluation

Figure 3:
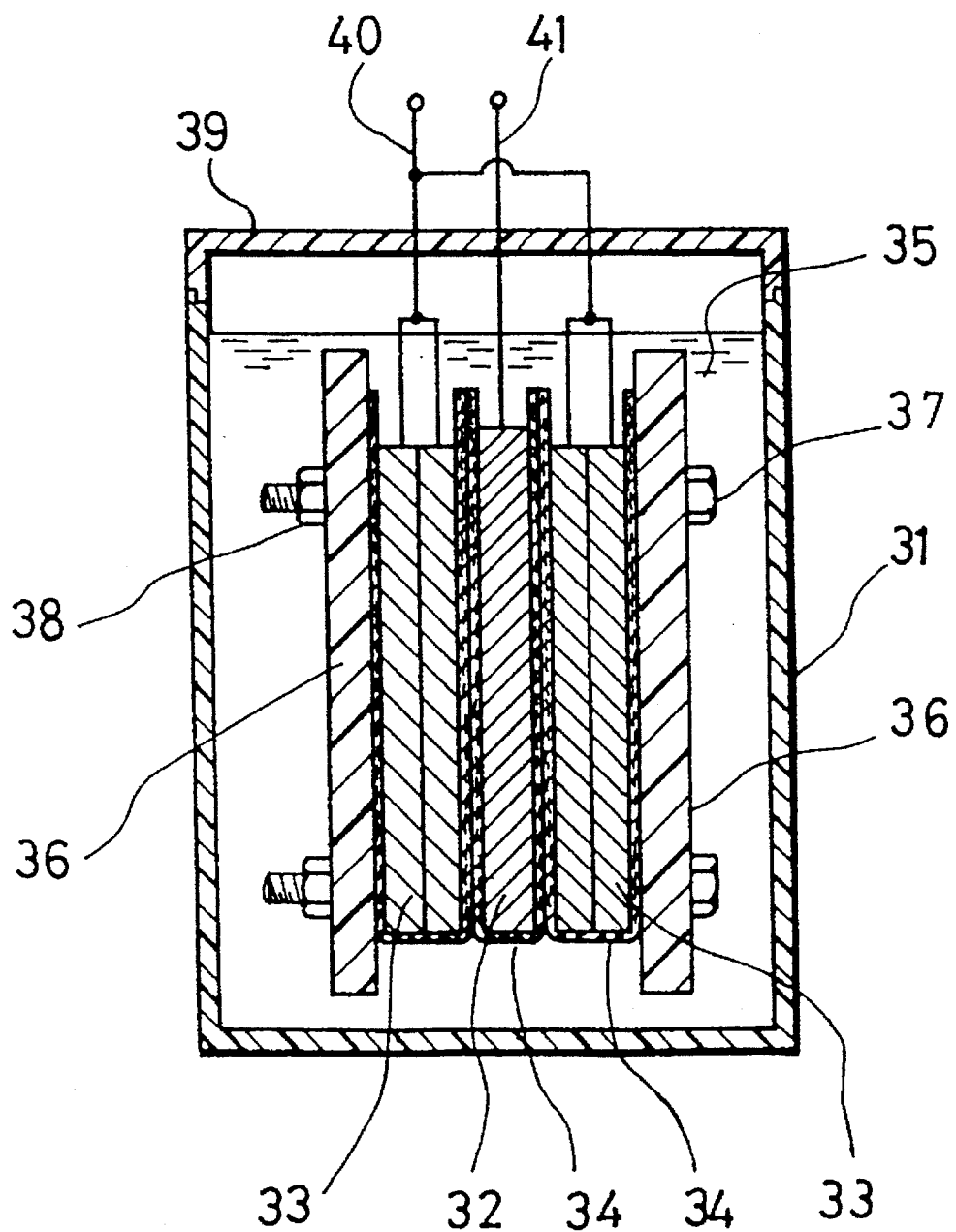
FIG. 3 is a cross-sectional side view showing a nickel-metal hydride storage battery employed for evaluating the metal hydride electrode in an embodiment of the present invention.

FIG. 3 is a schematic representation of a battery used for evaluation. As seen from FIG. 3, a vessel 31 accommodates an electrode assembly composed of the negative electrode 32, the positive electrodes 33, separators 34, acrylic resin plates 36, and fastening means 37 and 38, and an electrolyte 35, and is closed with a lid 39 on which a positive and negative terminals 40 and 41 are provided. The battery for evaluation was prepared in the following manner and its battery characteristics were evaluated.

The electrode assembly was actually configured by combining the negative electrode 32 prepared in the above-mentioned manner with a pair of the positive electrodes 33 each enclosed in a bag-like separator 34 made of polypropylene having a thickness of 0.2 mm and being placed on both faces of the negative electrode, and by securing the combined body with a pair of the acrylic resin plates 36 and fastening means 37 and 38. The electrode assembly was then placed in the cylindrical vessel 31 made of acrylic resin and a pair of lead wires were welded to the electrode conductors. After being injected with the electrolyte 35 consisting mainly of an aqueous solution of potassium hydroxide (density: 1.30 g/cm$^3$), the vessel 31 was closed with the lid 39 made of polypropylene provided with a small aperture, and evacuated for defoaming the electrolyte to complete a negative electrode-regulated battery for evaluation in a liquid-rich state. As seen from the result of the evaluation shown in Table 1 below, although the battery configured with the negative electrode comprising the hydrogen storage alloy particles prepared in accordance with this example has only a moderate discharge capacity, it has an advantage of an excellent cycle life. Another advantage of this example is the low manufacturing cost of the hydrogen storage alloy particles.

EXAMPLE 2

(Atomizing with Hypophosphorous Acid Solution)

In a manner similar to those in Example 1, other hydrogen storage alloy particles, whose composition is the same as that of Example 1, were prepared. In this example however, in place of water used in Example 1, an aqueous solution of hypophosphorous acid of 0.2N was jetted from the inner periphery of the melt-pouring nozzle at a pressure of 900 kg/cm$^2$ for atomizing the melt of the hydrogen storage alloy into the particles. The hydrogen storage ally particles thus obtained took a shape approximating to a sphere which is similar to the shape prepared in the atomizing process using water, and the surfaces of the particles were covered with oxide films (thickness: 0.1 μm). As a result of measurement on their particle diameter distribution, it was found that the average particle diameter of the obtained alloy particles was 22 μm, distributed in a range from 9 μm to 50 μm and the alloy particles contained those of 10 μm or smaller at only 0.5% by weight or less.

Thickness of Oxide Film

Figure 4:
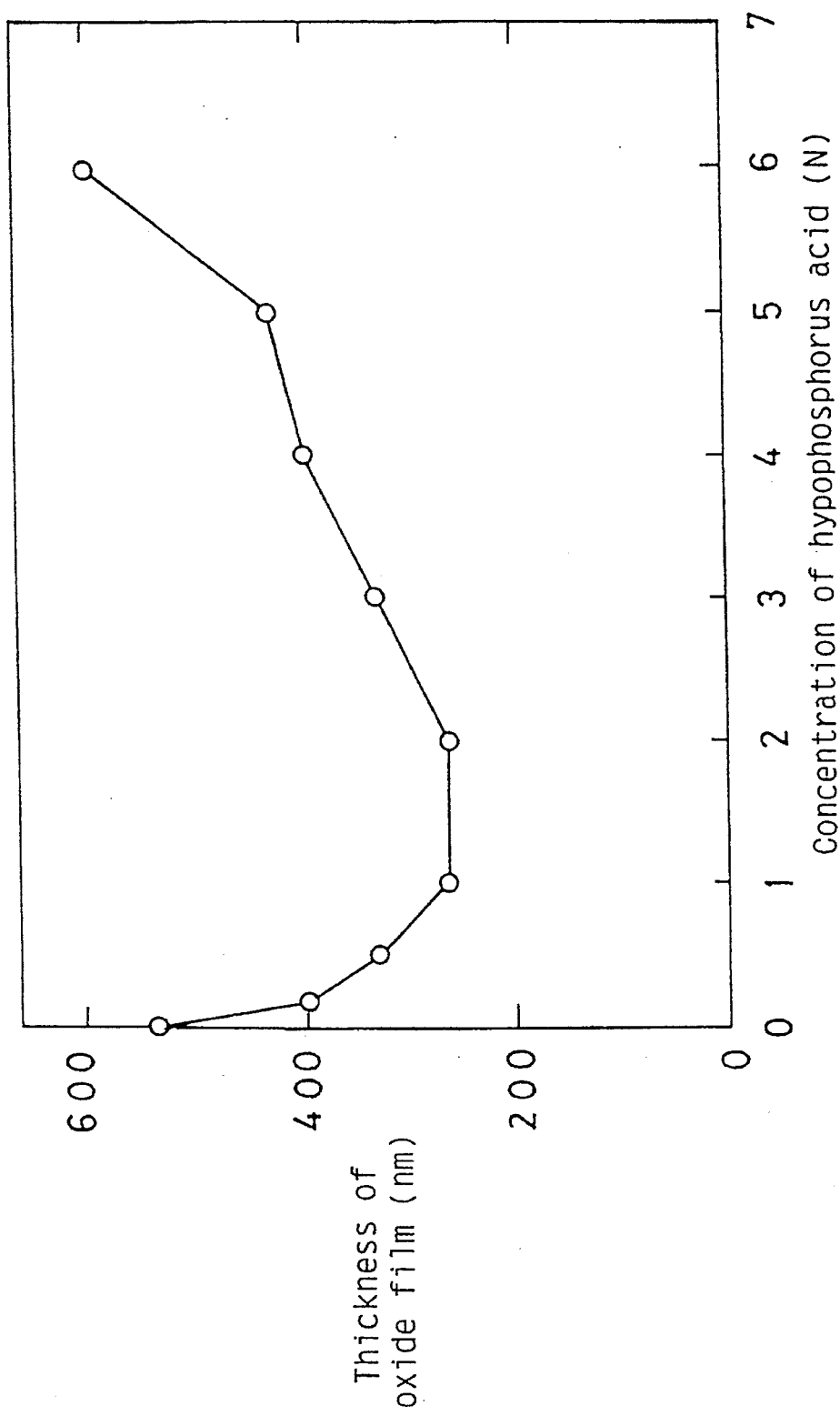
FIG. 4 is a diagram showing a relationship between the concentration of hypophosphorous acid aqueous solution employed in the water atomizing process and the thickness of oxide film formed on the surfaces of the resultant alloy particles.

FIG. 4 is a diagram showing the relationship between the concentration of the aqueous solution of hypophosphorous acid and the thickness of the oxide film formed on the surfaces of the obtained alloy particles. As seen from the diagram, it is appreciated that if the concentration of the aqueous solution of hypophosphorous acid is lower than 0.2N, obtained oxidation preventing effect is small, whereas if the concentration exceeds 5N, the obtained oxide film is too thick (0.4 μm or thicker), and that in both cases, a decrease in the discharge capacity is brought to a battery configured with the hydrogen storage alloy particles. From these results, it is confirmed that a suitable concentration of the aqueous solution of hypophosphorous acid is in a range between 0.2N and 5N. By employing the hydrogen storage alloy particles prepared by using the aqueous solution of hypophosphorous acid in place of water, a liquid-rich negative electrode-regulated battery was configured in a manner similar to those in Example 1 and its electrode characteristics were measured. The result of the measurement is shown in Table 1 below which reveals a great increase in the discharge capacity.

EXAMPLE 3

(Atomizing with Hypophosphorous Acid+Annealing under Hydrogen Gas Atmosphere)

The hydrogen storage alloy particles prepared in compliance with Example 2 were placed in an annealing furnace, and after evacuating the inside of the furnace by a rotary pump and a diffusion pump, hydrogen gas was introduced into the furnace up to 30 cmHg and the temperature inside the furnace was raised to and kept at 1000° for 3 hours. The temperature inside the furnace was gradually returned to room temperature over the next 8 hours and the apparatus was evacuated again for removing hydrogen gas absorbed in the alloy particles, and then returned again to the atmospheric pressure to prepare the hydrogen storage alloy particles of this example. By employing the hydrogen storage alloy particles prepared by annealing the once prepared alloy particles, a liquid-rich negative electrode-regulated battery was configured in a manner similar to those in Example 1 and its electrode characteristics were measured. The result of the measurement is shown in Table 1 below which reveals a great increase in the discharge capacity. The suitable conditions for the annealing were an annealing time in a range from 3 to 10 hours, annealing temperature in a range from 800° to 1200° C. and a cooling period of 3 hours or longer. The oxide film was effectively suppressed by the introduced hydrogen gas at a pressure ranging from 10 cmHg to 76 cmHg (atmospheric pressure). To the annealing furnace, a rubber balloon having a volume of ten times as much as the volume of the furnace was connected as a gas-buffer with a vent.

In a case of annealing the hydrogen storage alloy particles with argon gas in place of hydrogen gas, both of the discharge capacity and high-rate discharge characteristics of a battery configured with the alloy particles were decreased. It is believed that oxide films were formed on the surfaces of the hydrogen storage alloy particles during the annealing.

EXAMPLE 4

(Atomizing with Water+Annealing under H$_2$ Atmosphere)

First, hydrogen storage alloy particles were prepared in a process of Example 1. They were then subjected to an annealing treatment under the conditions that they were kept in a hydrogen gas atmosphere of hydrogen pressure of 50 cmHg at 1100° C. for 5 hours, and gradually cooled over the next 6 hours. By employing the hydrogen storage alloy particles thus prepared as the material for negative electrode, a battery for evaluation was configured in the structure and manner similar to those in Example 1.

EXAMPLE 5

(Alkali Treatment)

The hydrogen storage alloy particles prepared in Example 2 were soaked in an aqueous solution of potassium hydroxide of a density: 1.3 g/cm$^3$ at 70° C. and stirred well for 1 hour, and thereafter washed with water 6 times. By employing the hydrogen storage alloy particles thus prepared as the material for the negative electrode in a manner similar to those in Example 1, a battery for evaluation of a structure similar to that in Example 1 was configured by combining it with the nickel positive electrode.

In this alkali treatment, it was found that the following conditions were suitable for the initial activation of the electrode and the discharge capacity of the battery configured with the hydrogen storage alloy particles. The surface treatment was suitably performed with an aqueous solution of KOH and/or NaOH having a density ranging from 1.25 g/cm$^3$ to 1.35 g/cm$^3$ at a temperature in a range from 60° C. to 90° C. for a time period in a range from 20 minutes to 4 hours. The alkali treatment had realized a high discharge capacity. It was appreciated that if the time period for the alkali treatment was shorter than 20 minutes, the metal hydroxide layer on the surfaces of the particles was formed only scarcely, whereas if the time period exceeded 4 hours, the surfaces were excessively etched, rather leading to a decrease in the discharge capacity.

EXAMPLE 6

(Annealing under H$_2$ Atmosphere+Alkali Treatment)

The hydrogen storage alloy particles prepared in Example 3 (product which had been annealed in a hydrogen gas atmosphere) were soaked in an aqueous solution of potassium hydroxide of a density: 1.35 g/cm$^3$ at 90° C. and stirred well for 20 minutes, and thereafter washed with water 6 times. By employing the hydrogen storage alloy particles thus prepared as the material for negative electrode, a negative electrode was produced in a manner similar to those in Example 1, and a battery for evaluation of the same configuration as that of Example 1 was produced.

EXAMPLE 7

(Acid Treatment+Ultrasonic Vibration)

Figure 5:
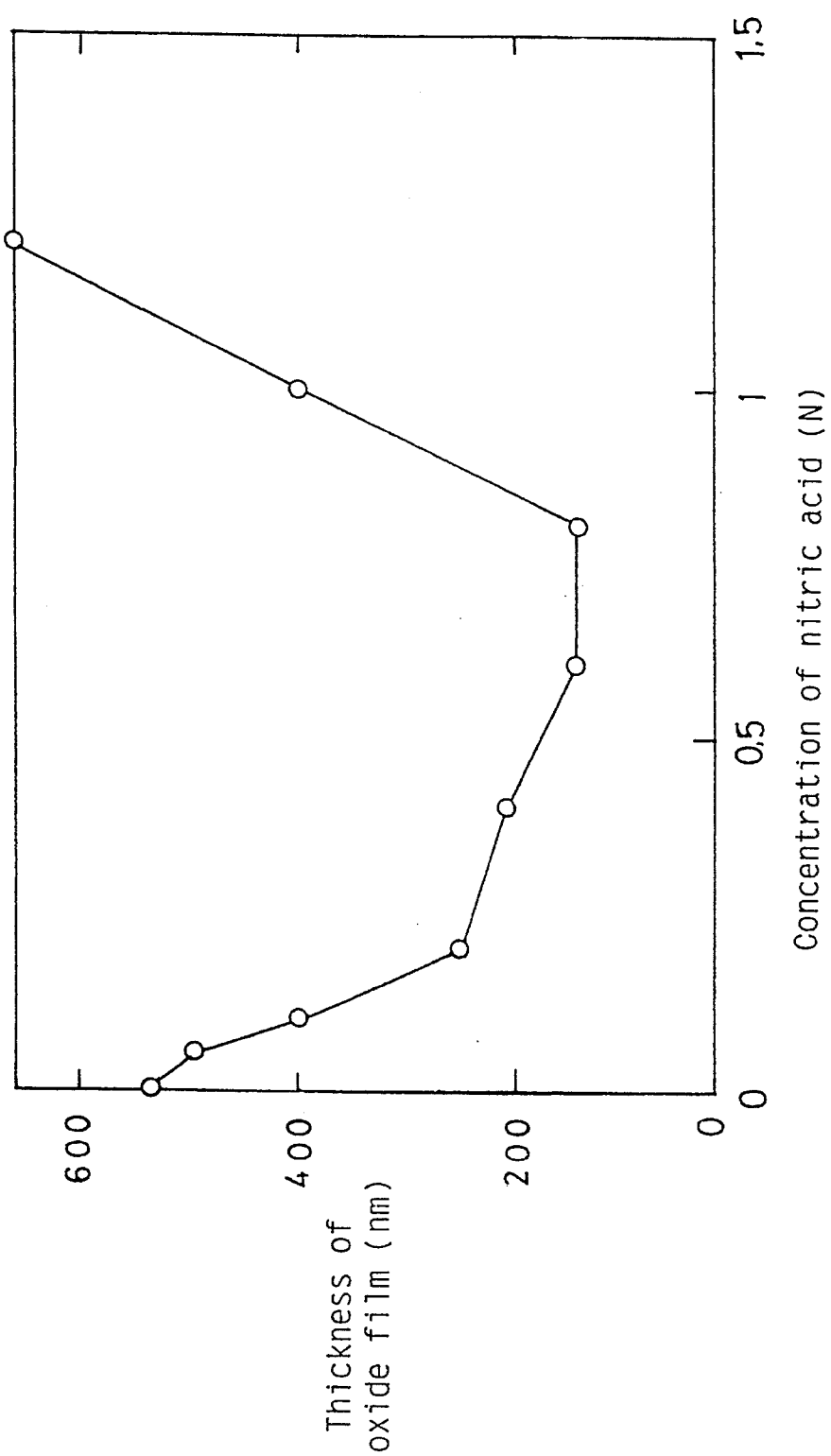
FIG. 5 is a diagram showing a relationship between the concentration of nitric acid aqueous solution used in the etching treatment and the thickness of the resultant oxide film on the surfaces of the treated alloy particles.

The hydrogen storage alloy particles prepared in compliance with the water atomizing process of Example 1 were soaked in an aqueous solution of nitric acid of 0.2N at 40° C. and stirred well by means of an ultrasonic vibrator for 1 minute, and thereafter washed with water 6 times. FIG. 5 is a diagram showing the relationship between the concentration of the nitric acid solution used in the etching treatment at 40° C. for 1 minute and the thickness of the resultant oxide film on the treated alloy particles. As seen from this diagram, it is found that if the concentration of the nitric acid solution is thinner than 0.1N, the effect of the etching treatment is insufficient, whereas if the concentration is thicker than 1N, the surfaces of the particles are intruded into their substrate metal layers, thereby producing rather thick oxide films (0.4 μm or thicker). Further, the reaction velocity of the acid treatment is too rapid with this high concentration, thereby to make the control of the degree of the etching difficult.

By employing the hydrogen storage alloy particles thus prepared as the material for negative electrode, a negative electrode was prepared in a manner similar to those in Example 1. Thus a liquid-rich negative electrode-regulated battery for evaluation was produced in the same configuration as that in Example 1.

In a case of employing hydrochloric acid in place of nitric acid, results substantially the same as the case of employing nitric acid were obtained. From these facts, it is appreciated that the concentration of the strong acid is suitably in a range between 0.1N and 1N.

EXAMPLE 8

(Reduction with Ca and CaCl$_2$)

To 100 parts by weight of the hydrogen storage alloy particles prepared in compliance with the water atomizing process of Example 1, added were 1 part by weight of Ca and 0.1 part by weight of CaCl$_2$, and mixed well. The mixture was then molded into blocks each having a tubular shape of an inner diameter of 30 mm, an outer diameter of 50 mm and a length of 20 mm by an oil pressure press. The blocks thus molded were heated in an argon gas atmosphere at 900° C. for 4 hours, to reduce the oxide films on the surfaces of the hydrogen storage alloy particles. The same results were obtained in another atmosphere of neon or helium other than argon with no substantial problem. The temperature for the reduction was suitably in a range from 700° C. to 1100° C. If the temperature is lower than 700° C., the reduction reaction takes a time period approximating to a whole day, whereas if the temperature exceeds 1100° C., the hydrogen storage alloy particles are molten and the expected advantage of the previous pulverization by means of water atomizing process is lost.

Although aluminum or magnesium may be used as the reducing agent, these metals had only a weak reducing ability and took a longer period of time than that with calcium for removing the oxide films. By making the shape of the blocks hollow structure, it was possible to suppress the rise in the temperature of the blocks due to the generation of heat by reduction, and to prevent sticking among the hydrogen storage alloy particles during the reaction. The proportion of the reducing agent to be added was suitably in a range from 1 to 20 parts by weight for 100 parts by weights of the hydrogen alloy particles.

Next, in order to remove CaO remaining on the surfaces of the hydrogen storage alloy particles thus prepared after the reduction, the particles were washed well with an aqueous solution of ammonium chloride and distilled water. After unbinding the particles in the solution and subsequent drying, the obtained particles (thickness of the oxide films: about 0.02 μm) were employed as the material for negative electrode to produce a negative electrode in a manner similar to those in Example 1, and a liquid-rich negative electrode-regulated battery for evaluation was produced in the same configuration as that in Example 1.

EXAMPLE 9

(Reduction of Disk Block with Ca)

To 100 parts by weight of the hydrogen storage alloy particles prepared in compliance with the water atomizing process of Example 1, added were 20 parts by weight of Ca, and mixed well. The mixture was then molded into blocks each having a disk shape of a diameter of 30 mm and a thickness of 5 mm by an oil pressure press. The blocks thus prepared were heated in an argon gas atmosphere at 1000° C. for 3 hours to reduce the oxide films on the surfaces of the hydrogen storage alloy particles.

Next, in order to remove CaO remaining on the surfaces of the hydrogen storage alloy particles thus prepared after the reduction, the particles were washed well with an aqueous solution of ammonium chloride and distilled water. After unbinding the particles in the solution and subsequent drying, the obtained particles (thickness of the oxide films: about 0.02 μm) were employed as the material for the negative electrode to produce a negative electrode in a manner similar to those in Example 1, and a liquid-rich negative electrode-regulated battery for evaluation of the same configuration as that in Example 1 was produced.

EXAMPLE 10

(Acid Treatment+Annealing under H$_2$ Atmosphere)

The hydrogen storage alloy particles (acid treated product) prepared in compliance with Example 7 were annealed by keeping them under hydrogen gas atmosphere (50 cmHg) at 1100° C. for 5 hours, and then gradually cooling them to room temperature over the next 6 hours. By employing the hydrogen storage alloy particles thus prepared as the material for the negative electrode, a battery for evaluation was configured in a manner similar to those in Example 1.

EXAMPLE 11

(Acid Treatment+Alkali Treatment)

The hydrogen storage alloy particles (acid treated product) prepared in compliance with Example 7 were soaked in an aqueous solution of sodium hydroxide of a density: 1.25 g/cm$^3$ at 60° C. for 4 hours, and then washed with water 6 times. By employing the hydrogen storage alloy particles thus prepared as the material for negative electrode, a battery for evaluation was configured in a manner similar to those in Example 1. Based on the reactivity of the aqueous solution, it was found that the temperature suitable for the alkali treatment was in a range from 60° C. to 90° C.

EXAMPLE 12

(Annealing under H$_2$ Atmosphere+Acid Treatment with Ultrasonic Vibration)

The hydrogen storage alloy particles prepared in compliance with Example 1 were annealed by keeping them under hydrogen gas atmosphere (76 cmHg) at 1200° C. for 5 hours, and then gradually cooling them to room temperature over the next 8 hours. Next, the alloy particles were soaked in an aqueous solution of hydrochloric acid of 1N at 25° C. and stirred by means of an ultrasonic vibrator for 1 minute, and then washed with water 6 times to obtain hydrogen storage alloy particles. By employing the hydrogen storage alloy particles thus prepared as the material for the negative electrode, a battery for evaluation was configured in a manner similar to those in Example 1.

EXAMPLE 13

(Acid Treatment+Annealing under H$_2$ atmosphere+Alkali Treatment)

The hydrogen storage alloy particles (acid treated product) prepared in compliance with Example 7 were annealed by keeping them under hydrogen gas atmosphere (30 cmHg) at 800° C. for 10 hours, and then gradually cooling them to room temperature over the next 5 hours. The alloy particles were then soaked in an aqueous solution of potassium hydroxide of a density: 1.35 g/cm$^3$ at 80° C. for 20 minutes, and washed with water 6 times. By employing the hydrogen storage alloy particles thus prepared as the material for the negative electrode, a battery for evaluation was configured in a manner similar to those in Example 1.

EXAMPLE 14

(Atomizing with Alkali Solution)

Hydrogen storage alloy particles were prepared by using the same water atomizing apparatus as in Example 1, except for the use of an alkali aqueous solution in place of water. The composition of the hydrogen storage alloy was identical with that of Example 1. Constituent metals in predetermined amounts were first placed in the high frequency melting furnace filled with argon gas to be molten, and the molten alloy was transferred into the retainer furnace, and then poured into the collector silo excellent in alkali-resistant property and filled with argon gas through the melt-pouring nozzle. During this step, an aqueous solution of KOH at pH10 was jetted from the inner periphery of the melt-pouring nozzle and collided with the melt to pulverize the melt of the hydrogen storage alloy, thereby to prepare the hydrogen storage alloy particles.

One hour later, the hydrogen storage alloy particles thus prepared were then taken out from the collector silo and washed well with water, and then dried. Time point for taking out the resultant particles subsequent to the atomizing step is desirably in 1 hour or shorter. If the period is longer than this, the surfaces of the hydrogen storage alloy particles are etched too violently, leading to a decrease in the discharge capacity of the battery configured with the hydrogen storage alloy particles.

The hydrogen storage alloy particles thus obtained took various shapes, including those from a shape approximating to a sphere to those like a gourd-shape, constituted solely with curved surfaces with no acute edges, and their surfaces are covered with needle-like metal hydroxide of Mm. By employing the hydrogen storage alloy particles thus prepared as the material for the negative electrode, a battery for evaluation was configured in a manner similar to those in Example 1.

The alkali aqueous solution to be used in this atomizing process was suitably an aqueous solution of KOH and/or NaOH at pH10–pH13. If this value is lower than pH10, effect of the alkali treatment is insufficient, whereas if it is higher than pH13, the alloy particles are excessively dissolved in the solution, leading to a decrease in the discharge capacity. Another disadvantage with this high pH value is a possible corrosion of the collector silo.

EXAMPLE 15

(Atomizing with Alkali Solution+Annealing under H$_2$ Atmosphere)

The hydrogen storage alloy particles prepared in compliance with Example 14 were annealed by keeping them under hydrogen gas atmosphere (20 cmHg) at 1000° C. for 5 hours, and then gradually cooling them to room temperature over the next 6 hours. By employing the hydrogen storage alloy particles thus prepared as the material for the negative electrode, a battery for evaluation was configured in a manner similar to those in Example 1.

EXAMPLE 16

(Alkali Treatment with NaOH)

Hydrogen storage alloy particles were first prepared in compliance with the water atomizing process in Example 1. Next, they were alkali-treated by soaking them in an aqueous solution of NaOH having a density: 1.25 g/cm$^3$ at 60° C. for 4 hours. By employing the hydrogen storage alloy particles thus prepared as the material for the negative electrode, a battery for evaluation was configured in a manner similar to those in Example 1.

EXAMPLE 17

(Annealing under H$_2$ Atmosphere+Alkali Treatment with KOH)

The hydrogen storage alloy particles prepared and annealed in compliance with the process in Example 4 were used in this example. The annealed alloy particles were alkali-treated by soaking them in an aqueous solution of potassium hydroxide having a density of 1.3 g/cm$^3$ at 70° C. for 20 minutes, stirred well, and then washed with water 6 times. By employing the hydrogen storage alloy particles thus prepared as the material for the negative electrode, a battery for evaluation was configured in a manner similar to those in Example 1.

EXAMPLE 18

(Annealing under Vacuum)

Hydrogen storage alloy particles were first prepared in compliance with the water atomizing process in Example 1. Next, they were subjected to an annealing under vacuum by keeping them at 1100° C. for 5 hours and gradually cooling them over the next 6 hours. By employing the hydrogen storage alloy particles thus prepared as the material for the negative electrode, a battery for evaluation was configured in a manner similar to those in Example 1.

Comparative Example 1

(Conventional Cast/Pulverizing Process)

An ingot of the hydrogen storage alloy having the same composition ($MmNi_{3.7}Mn_{0.4}Al_{0.3}Co_{0.6}$) as that in Example 1 was prepared in accordance with a casting process by using a high frequency melting furnace, and annealed under vacuum at 1100° C. for 5 hours followed by a gradual cooling which took 6 hours. The ingot thus obtained is coarsely crashed by a stamping mill, and then pulverized by a jet mill to particles having an average particle diameter of 25 μm (cast/pulverizing process). Next, the particles were alkali-treated under the same conditions as those in Example 3 (soaking in an aqueous solution of potassium hydroxide having a density of 1.3 g/cm³ at 70° C. for 1 hour, followed by washings with water 6 times), and were removed of particles of 37 μm or larger contained therein by screening with a 400-mesh sieve to recover those particles having an average particle diameter of 22 μm. By employing the hydrogen storage alloy particles thus prepared as the material for the negative electrode, a battery for evaluation was configured in a manner similar to those in Example 1.

Comparative Example 2

(Conventional Argon Gas Atomizing Process)

Hydrogen storage alloy particles were prepared in accordance with an argon gas atomizing process by using the hydrogen storage alloy having the same composition as that in Example 1. The particles thus obtained had a shape of substantially a true sphere having an average particle diameter of about 65 μm, and the degree of oxidation of the surface of the particles was considerably small (thickness of the oxide film is about 0.05 μm). They were then annealed under vacuum in a manner similar to that in Comparative Example 1, and then pulverized by a jet mill in order to attain a smaller average particle diameter. Thereafter, the particles were removed of particles of 37 μm or larger contained therein by screening with a 400-mesh sieve to recover those particles having an average particle diameter of 22 μm. From the result of particle diameter distribution measurement on the obtained hydrogen storage alloy particles, it was found that particles smaller than 10μ were contained therein at about 5% by weight. By employing the hydrogen storage alloy particles thus prepared as the material for the negative electrode, a battery for evaluation was configured in a manner similar to those in Example 1.

Evaluation of Battery Characteristics

Table 1 summarizes the results of comparison on the characteristics of the batteries of the foregoing Examples and Comparative Examples.

TABLE 1

| | Discharge capacity (mAh/g) | Cycle life | High-rate discharge characteristics (1C/0.2C) | Cost |
| --- | --- | --- | --- | --- |
| Example 1 | 210 | 1400 | 70% | ⊙ |
| Example 2 | 280 | 1400 | 85% | ⊙ |
| Example 3 | 288 | 1200 | 89% | o |
| Example 4 | 230 | 1300 | 75% | Δ |
| Example 5 | 284 | 1300 | 88% | o |
| Example 6 | 292 | 1150 | 92% | Δ |
| Example 7 | 278 | 1600 | 83% | o |
| Example 8 | 295 | 1200 | 95% | Δ |
| Example 9 | 283 | 1300 | 88% | Δ |
| Example 10 | 281 | 1350 | 88% | o |
| Example 11 | 281 | 1400 | 87% | Δ |
| Example 12 | 285 | 1200 | 88% | Δ |
| Example 13 | 282 | 1300 | 88% | ⊙ |
| Example 14 | 286 | 1200 | 90% | Δ |
| Example 15 | 213 | 1250 | 72% | o |
| Example 16 | 220 | 1300 | 72% | Δ |
| Example 17 | 235 | 1200 | 77% | Δ |
| Example 18 | 225 | 1350 | 72% | Δ |
| Comparative Example 1 | 290 | 800 | 95% | X |
| Comparative Example 2 | 290 | 900 | 93% | X |

In Table 1, the discharge capacity of the battery is presented as an initial discharge capacity measured at the end of the fifth discharging process at 0.2 C. in the repetition of 5 charging and discharging cycles performed In a mode of charging at 0.1 C. for 12 hours, and discharging at 0.2 C. until the battery voltage decreased to 0.9 V at 20° C. On and after the sixth cycle, the charging and discharging processes were still repeated in a mode of charging up to 100% of charge depth for the previous discharged electric quantity at 2 C. (about 1.7 A) and discharging until the battery voltage decreased to 0.9 V at 2 C. (discharge depth: 100%), and the discharge capacity was confirmed in every 50 cycles by charging at 0.1 C. for 12 hours (charge depth: 120%) and discharging until the battery voltage decreased to 0.9 V at 0.2 C. In this manner, the cycle life was defined and indicated by the number of cycles at the end of which the discharge capacity decreased to 80% of or smaller than the initial discharge capacity measured at the fifth cycle. The high-rate discharge characteristics were indicated as the discharge capacity ratio (discharge capacity at 1 C.)/(discharge capacity at 0.2C.) to be compared.

As for the cost required, a reduction in the cost is represented by Δ, a more effective reduction is represented by o, and the maximal reduction is represented by ⊙, compared with the costs in Comparative Examples 1 and 2.

As seen from Table 1, it is appreciated that the initial discharge capacity of the negative electrode obtained with that of Comparative Example 1, which is the most standard manufacturing process, is 290 mAh/g and is substantially equal to those in Examples of the present invention. It is believed that in the case of Comparative Example 1, the initial discharge capacity (negative electrode utilization rate) does not become high because its manufacturing process produces, in its pulverizing step, fine particles of 10 μm or smaller which do not contribute to the electrode reaction in large quantities (about 10% by weight). In the cases of Examples, although the fine particles of 10 μm or smaller do not exist in large quantities, the initial discharge capacity does not however become sufficiently high, because the oxide films formed on the surfaces of the hydrogen storage alloy particles inhibit the absorption and desorption of hydrogen.

From data of Example 4 and Example 18, it is appreciated that the annealing in a hydrogen gas atmosphere is advantageous in the point of view of the initial discharge capacity. The product of the argon gas atomizing, pulverizing and annealing process in compliance with Comparative Example 2 has a moderate discharge capacity but is favorable in the cycle life characteristics.

In the point of view of the cycle life characteristics, although the product of Comparative Example 1 demonstrated a decrease up to 80% of the peak discharge capacity at about 900th cycle, any of the products of Examples of the present invention had a long cycle life of 1150th cycle or longer. The reason for this is believed to be that in the case of Comparative Example 1 which contains a pulverizing step, the resultant particles are each having a polygonal shape with acute edges, and thus are liable to be cracked and subsequently pulverized into finer particles. In the products of Examples on the other hand, the shapes of the particles are spherical or those approximating to a sphere with no plane of mechanical cleavages and thus the subsequent pulverizing hardly occurs with the particles.

In the point of view of the high-rate discharging characteristics, the pulverized product is somewhat superior to the other products. In the point of view of the manufacturing cost, the products of Comparative Examples 1 and 2 are disadvantageous because their processes require a separate pulverizing step, whereas those of Examples are advantageous because the pulverizing step can be dispensed with and the particles are produced in a single step. A great reduction in the manufacturing cost attributable to a great reduction in the number of steps can be realized in the cases of Examples 14 and 15, because they contain a single continuous step up to the alkali treatment.

Further, although the foregoing description is limited to the particular hydrogen storage alloy of the $AB_5$ type, the manufacturing process in accordance with the present invention can also be similarly applied to other hydrogen storage alloys of the $AB_5$ type with similar advantages. Among others, those alloys represented by the formula: $MmNi_aMn_bAl_cCo_d$ (wherein, $0<a$, $0<b$, $0<c$, $0<d$, and wherein $4.5<a+b+c+d<6.0$, more preferably $3.0<a<4.5$) are preferable. The manufacturing process in accordance with the present invention can also be similarly be applied to alloys of the $AB_2$ type mainly composed of Zr, Mn, V, Cr and Ni, and the resultant hydrogen storage alloy particles demonstrate the characteristics substantially the same as those obtained with the $AB_5$ type alloy.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for manufacturing hydrogen storage alloy particles comprising steps of:

obtaining a melt of the hydrogen storage alloy, and pulverizing the hydrogen storage alloy by an aqueous atomizing process, whereby the melt is pulverized by contacting or colliding the melt with a high-speed aqueous material, thereby dispersing the melt in the form of solidified fine particles, wherein the high-speed aqueous material is an aqueous solution of hypophosphorus acid.

2. The method for manufacturing hydrogen storage alloy particles in accordance with claim 1, wherein a concentration of the aqueous solution of hypophosphorus acid is in a range from 0.2N to 5N.

3. The method for manufacturing hydrogen storage alloy particles in accordance with claim 1, further comprising a step of annealing the hydrogen storage alloy particles in a hydrogen gas atmosphere.

4. The method of manufacturing hydrogen storage alloy particles in accordance with claim 3, wherein said step of annealing comprises placing the hydrogen storage alloy particles in an annealing chamber, introducing hydrogen gas into the annealing chamber at 10–76 cmHg after evacuating the annealing chamber, then maintaining the annealing chamber at a temperature in a range from 800° to 1200° C. for 3 hours or longer, and thereafter gradually cooling the inside space of the annealing chamber over the next 3 hours or longer.

5. The method for manufacturing hydrogen storage alloy particles in accordance with claim 3, further comprising a step of surface treatment whereby the hydrogen storage alloy particles are soaked in a strong alkali aqueous solution at a high temperature and washed with water.

6. The method for manufacturing hydrogen storage alloy particles in accordance with claim 3, wherein the hydrogen storage alloy particles are soaked in a strong alkali aqueous solution of at least one selected from the group consisting of potassium hydroxide and sodium hydroxide whose temperature is in a range from 60° C. to 90° C. and density is 1.25–1.35 $g/cm^3$ for a period ranging from 20 minutes to 4 hours, followed by washing with water.

7. The method for manufacturing hydrogen storage alloy particles in accordance with claim 1, further comprising a step of surface treatment whereby the hydrogen storage alloy particles are soaked in a strong alkali aqueous solution at a high temperature and then washed with water.

8. The method for manufacturing hydrogen storage alloy particles in accordance with claim 7, wherein the strong alkali aqueous solution is an aqueous solution of at least one selected from the group consisting of potassium hydroxide and sodium hydroxide whose temperature is in a range from 60° C. to 90° C. and density is 1.25–1.35 $g/cm^3$, and wherein the hydrogen storage alloy particles are soaked in said alkali aqueous solution for a period ranging from 20 minutes to 4 hours.

9. The method of claim 1 which further comprises the step of removing at least part of oxide film formed on the surfaces of the solidified fine particles of hydrogen storage alloy comprising reducing said oxide film with a reducing agent, and said reducing step comprises heating a press-molded body of a mixture containing a reducing agent comprising metal calcium or metal calcium and calcium chloride and the hydrogen storage alloy particles in an inert gas atmosphere at a temperature ranging from 700° C. to 1100° C.

10. The method for manufacturing hydrogen storage alloy particles in accordance with claim 9, further comprising a step of washing the press-molded body previously subjected to the reduction with water or an aqueous solution of ammonium chloride.

11. A method for manufacturing hydrogen storage alloy particles comprising steps of:

pulverizing the hydrogen storage alloy by a water atomizing process, and removing at least part of an oxide film formed on the surfaces of the obtained hydrogen storage alloy particles, wherein said removing step comprises reducing said oxide film with a reducing agent, and said reducing step comprises heating a press-molded body of a mixture containing a reducing agent, comprising metal calcium or metal calcium and calcium chloride, and the hydrogen storage alloy particles in an inert gas atmosphere at a temperature ranging from 700° C. to 1100° C.

12. The method for manufacturing hydrogen storage alloy particles in accordance with claim 11, further comprising a step of washing the press-molded body previously subjected to the reduction with water or an aqueous solution of ammonium chloride.

13. A method for manufacturing hydrogen storage alloy particles comprising steps of:

obtaining a melt of the hydrogen storage alloy, pulverizing the hydrogen storage alloy by an aqueous atomizing process, whereby the melt is pulverized by contacting or colliding the melt with a high-speed aqueous material, thereby dispersing the melt in the form of solidified fine particles, and annealing the hydrogen storage alloy particles in a hydrogen gas atmosphere.

14. The method for manufacturing hydrogen storage alloy particles in accordance with claim 13, wherein said step of annealing comprises placing the hydrogen storage alloy particles in an annealing chamber, introducing hydrogen gas into the annealing chamber at 10–76 cmHg after evacuating the annealing chamber, then maintaining the annealing chamber at a temperature in a range from 800° C. to 1200° C. for 3 hours or longer, and thereafter gradually cooling the inside space of the annealing chamber over the next 3 hours or longer.

15. The method for manufacturing hydrogen storage alloy particles in accordance with claim 13, further comprising a step of surface treatment whereby the hydrogen storage alloy particles are soaked in a strong alkali aqueous solution at a high temperature and washed with water.

16. The method for manufacturing hydrogen storage alloy particles in accordance with claim 13, wherein the hydrogen storage alloy particles are soaked in a strong alkali aqueous solution of at least one selected from the group consisting of potassium hydroxide and sodium hydroxide whose temperature is in a range from 60° C. to 90° C. and density is 1.25–1.35 g/cm$^3$ for a period ranging from 20 minutes to 4 hours, followed by washing with water.

17. A method for manufacturing hydrogen storage alloy particles comprising steps of:

pulverizing the hydrogen storage alloy by a water atomizing process, removing at least part of an oxide film formed on the surfaces of the obtained hydrogen storage alloy particles, and annealing the hydrogen storage alloy particles in a hydrogen gas atmosphere.

18. The method of manufacturing hydrogen storage alloy particles in accordance with claim 17, wherein said step of annealing comprises placing the hydrogen storage alloy particles in an annealing chamber, introducing hydrogen gas into the annealing chamber at 10–76 cmHg after evacuating the annealing chamber, then maintaining the annealing chamber at a temperature in a range from 800° to 1200° C. for 3 hours or longer, and thereafter gradually cooling the inside space of the annealing chamber over the next 3 hours or longer.

19. The method for manufacturing hydrogen storage alloy particles in accordance with claim 17, further comprising a step of surface treatment whereby the hydrogen storage alloy particles are soaked in a strong alkali aqueous solution at a high temperature and washed with water.

20. The method for manufacturing hydrogen storage alloy particles in accordance with claim 17, wherein the hydrogen storage alloy particles are soaked in a strong alkali aqueous solution of at least one selected from the group consisting of potassium hydroxide and sodium hydroxide whose temperature is in a range from 60° C. to 90° C. and density is 1.25–1.35 g/cm$^3$ for a period ranging from 20 minutes to 4 hours, followed by washing with water.

21. A method for manufacturing hydrogen storage alloy particles comprising steps of:

obtaining a melt of the hydrogen storage alloy, pulverizing the hydrogen storage alloy by an aqueous atomizing process, whereby the melt is pulverized by contacting or colliding the melt with a high-speed aqueous material, thereby dispersing the melt in the form of solidified fine particles, and performing a surface treatment step whereby the hydrogen storage alloy particles are soaked in a strong alkali aqueous solution at a high temperature and then washed with water.

22. The method for manufacturing hydrogen storage alloy particles in accordance with claim 21, wherein the strong alkali aqueous solution is an aqueous solution of at least one selected from the group consisting of potassium hydroxide and sodium hydroxide whose temperature is in a range from 60° C. to 90° C. and density is 1.25–1.35 g/cm$^3$ and wherein the hydrogen storage alloy particles are soaked in said alkali aqueous solution for a period ranging from 20 minutes to 4 hours.

23. A method for manufacturing hydrogen storage alloy particles comprising steps of:

pulverizing the hydrogen storage alloy by a water atomizing process, removing at least part of an oxide film formed on the surfaces of the obtained hydrogen storage alloy particles, and performing a surface treatment step whereby the hydrogen storage alloy particles are soaked in a strong alkali aqueous solution at a high temperature and then washed with water.

24. The method for manufacturing hydrogen storage alloy particles in accordance with claim 23, wherein the strong alkali aqueous solution is an aqueous solution of at least one selected from the group consisting of potassium hydroxide and sodium hydroxide whose temperature is in a range from 60° C. to 90° C. and density is 1.25–1.35 g/cm$^3$, and wherein the hydrogen storage alloy particles are soaked in said alkali aqueous solution for a period ranging from 20 minutes to 4 hours.

25. A method for manufacturing hydrogen storage alloy particles comprising steps of:

obtaining a melt of the hydrogen storage alloy, and pulverizing the hydrogen storage alloy by an aqueous atomizing process, whereby the melt is pulverized by contacting or colliding the melt with a high-speed aqueous material, thereby dispersing the melt in the form of solidified fine particles, said aqueous material being an alkali aqueous solution.

26. The method for manufacturing hydrogen storage alloy particles in accordance with claim 25, wherein the alkali aqueous solution is a potassium hydroxide or sodium hydroxide solution having a pH value ranging from 10 to 13.

27. The method for manufacturing hydrogen storage alloy particles in accordance with claim 25, further comprising a step of annealing the hydrogen storage alloy particles in a hydrogen gas atmosphere.

28. The method of manufacturing hydrogen storage alloy particles in accordance with claim 27, wherein said step of annealing comprises placing the hydrogen storage alloy particles in an annealing chamber, introducing hydrogen gas into the annealing chamber at 10–76 cmHg after evacuating the annealing chamber, then maintaining the annealing chamber at a temperature in a range from 800° to 1200° C. for 3 hours or longer, and thereafter gradually cooling the inside space of the annealing chamber over the next 3 hours or longer.

29. The method for manufacturing hydrogen storage alloy particles in accordance with claim 27, further comprising a step of surface treatment whereby the hydrogen storage alloy particles are soaked in a strong alkali aqueous solution at a high temperature and washed with water.

30. The method for manufacturing hydrogen storage alloy particles in accordance with claim 27, wherein the hydrogen storage alloy particles are soaked in a strong alkali aqueous solution of at least one selected from the group consisting of potassium hydroxide and sodium hydroxide whose temperature is in a range from 60° C. to 90° C. and density is 1.25–1.35 g/cm$^3$ for a period ranging from 20 minutes to 4 hours, followed by washing with water.

31. The method of claim 25, which further comprises the step of removing at least part of oxide film formed on the surfaces of the solidified fine particles of hydrogen storage alloy comprising reducing said oxide film with a reducing agent, and said reducing step comprises heating a press-molded body of a mixture containing a reducing agent comprising metal calcium or metal calcium and calcium chloride and the hydrogen storage alloy particles in an inert gas atmosphere at a temperature ranging from 700° C. to 1100° C.

32. The method for manufacturing hydrogen storage alloy particles in accordance with claim 31, further comprising a step of washing the press-molded body previously subjected to the reduction with water or an aqueous solution of ammonium chloride.

* * * * *